(12) United States Patent
Wikström et al.

(10) Patent No.: US 6,241,810 B1
(45) Date of Patent: Jun. 5, 2001

(54) ELECTROSTATIC FILTER AND SUPPLY AIR TERMINAL

(75) Inventors: Göran Wikström, Verbier (CH); Ulf Hörnquist, Västerås (SE)

(73) Assignee: Purocell S.A., Verbier (CH)

( * ) Notice: Subject to any disclaimer, the term of this patent is extended or adjusted under 35 U.S.C. 154(b) by 0 days.

(21) Appl. No.: 09/599,389

(22) Filed: Jun. 23, 2000

Related U.S. Application Data

(62) Division of application No. 08/875,946, filed as application No. PCT/SE96/00151 on Feb. 8, 1996, now Pat. No. 6,090,189.

(30) Foreign Application Priority Data

Feb. 8, 1995 (SE) ..................................... 9500461

(51) Int. Cl.[7] ................................. B03C 3/49; B03C 3/64
(52) U.S. Cl. ......................................... 96/69; 55/DIG. 38
(58) Field of Search .................................. 96/69, 96, 98, 96/99, 77–79, 85–88; 55/DIG. 38

(56) References Cited

U.S. PATENT DOCUMENTS

| | | | |
|---|---|---|---|
| 2,181,767 | 11/1939 | Penney | 96/79 |
| 2,873,000 | 2/1959 | Elam | 96/77 |
| 2,875,845 | 3/1959 | Penney | 96/85 |
| 2,926,749 | * 3/1960 | Oswald | 55/DIG. 38 |
| 2,989,144 | * 6/1961 | Styrie | 55/DIG. 38 |
| 3,487,610 | 1/1970 | Brown et al. | 96/69 |
| 3,782,905 | * 1/1974 | Huang et al. | 55/DIG. 38 |
| 3,918,939 | 11/1975 | Hardt | 96/99 |
| 4,072,477 | 2/1978 | Hanson et al. | 55/DIG. 38 |
| 4,652,281 | 3/1987 | Masuda et al. | 96/69 |
| 4,861,356 | 8/1989 | Penney | 96/77 |
| 6,090,189 | * 7/2000 | Wikstrom et al. | 96/69 |

FOREIGN PATENT DOCUMENTS

| | | | |
|---|---|---|---|
| 0 084 572 | 8/1983 | (EP) . | |
| 0 626 886 | 12/1994 | (EP) . | |
| 53-069980 | 6/1978 | (JP) . | |
| 61-164664 | 7/1986 | (JP) . | |
| 62-144768 | 6/1987 | (JP) . | |
| 469 466 | 7/1993 | (SE) . | |
| WO 93/16807 | 9/1993 | (WO) | 96/96 |
| WO 95/07759 | 3/1995 | (WO) . | |

* cited by examiner

Primary Examiner—Richard L. Chiesa
(74) Attorney, Agent, or Firm—Young & Thompson

(57) ABSTRACT

An electrostatic filter for the separation of particles includes a particle charging unit arranged upstream, includes at least one corona wire for the charging of particles and a particle collector unit arranged downstream relative to it. The particle collecting unit includes two groups of plate-like elements (1, 1') arranged essentially parallel between each other and the flow direction through the device at a predetermined distance from each other, wherein a first group of elements (1) is connected to earth (3) and a second group of elements (1') is electrically insulated with reference to the device and to the first group of elements (1) and that the elements (1, 1') essentially are made of one or more non-hygroscopic polymer materials with a mass resistivity which preferably lies within the region of $1 \times 10^2$ Ωcm to $1 \times 10^8$ Ωcm. In one embodiment the elements are alternatively offset to each other in the longitudinal direction of the unit, whereby the first group of earthed elements (1) are arranged furthest away from the particle charging part and the other group of elements (1') are electrically insulated with reference to the device and to the first group of elements (1) and arranged nearer the particle charging part.

10 Claims, 3 Drawing Sheets

ELECTROSTATIC FILTER AND SUPPLY AIR TERMINAL

CROSS-REFERENCE TO RELATED APPLICATIONS

This application is a division of application Ser. No. 08/875,946, filed Aug. 7, 1997, now U.S. Pat. No. 6,090,189 which was the 35 USC 371 national phase of International application PCT/SE96/00151 filed on Feb. 8, 1996, which designated the United States.

FIELD OF THE INVENTION

The present invention relates to an electrostatic filter for the separation of particles out a flowing gaseous medium and a supply air terminal comprising such a filter. The filter comprises a particle charging unit arranged upstream comprising at least one corona wire for the charging of the particles and a particle collector unit arranged downstream relative to his. Such filters are known in the prior art.

BACKGROUND OF THE INVENTION

Normal air cleaners comprise a filter with an ionizing sector in which the particles comprised in the air flowing through the air cleaner are ionized. i.e. receive an electric charge. The particles then pass a particle collector unit where the charged particles interact with an electrical field produced by plates charged with an opposite electrical charge. In this manner the particles are driven towards the plates and collide with the plates and are collected.

Swedish Patent DE-B-401 327 relates to an electrostatic filter which comprises wireshaped conductors, so called corona wires, and plates with different electrical potentials. There are particles in the medium flowing through the filter which are charged and attracted and struck onto the plates which have the reverse polarity relative to the particles charged during the passage between the corona wires. An insulating plate is arranged between each plate in order to prevent spark-over between the electrically charged plates, caused amongst others by the build-up of a layer of the particles attracted to the plates. The biggest disadvantage with such a filter is that one must use many plates, both charged and insulating, in order to achieve a suitable total filter area.

Another significant disadvantage is that after a relatively short period of time the filter loses a considerable amount of efficiency and particle collecting capacity. By reason this the filter must be cleaned at relatively short time intervals which often is a labor and time-consuming job.

Another disadvantage which appears with the above type of filter with electrically charged plates is that when the particles move in the field between the plates a number of the particles already become discharged at a distance from the plates through spark-over and the particles then may possibly not stick onto the plates but instead follow the air flow through the filter arrangement and out into the surroundings again. Another type of filter device is shown in SE,A,7114330-9 (372 180). In this a device for the separation of particles out of a gas flow is described in which a number of high voltage electrodes and collector elements for the charged particles are alternatively arranged one after the other in the direction of the gas flow. The collecting elements consist of a network of paper, possibly metallized, which is earthed. The paper in the network has a weak conductivity.

It has now become apparent that the paper used for this purpose has a large disadvantage in that it is hygroscopic because in the case that the paper absorbs moisture it changes characteristics with respect to its conductivity.

From JP-61-164664(A) a filter is known comprising corona electrodes and opposing electrodes which are electrically conducting and connected to the opposing pole (earth) of a voltage source with respect to the connection of the corona wires. Between these "opposingly charged" electrodes "acceleration electrodes" made of electrically insulating material are arranged. The distance between the corona electrode and the "opposingly charged" (earthed) electrodes is shorter than the corresponding distance between the corona electrode and the acceleration electrodes made of the electrically insulating material.

In this field it is also known to use sheet aluminum in the particle collection plates. This has, however, the disadvantage that during use it oxidizes. This means that the surface the plates becomes more and more electrically insulating with a reduced particle collecting effect as a result. During the cleaning/regenerating of these plates strongly basic cleaning solutions must be used in order to destroy the aluminum oxide. This is obviously a big disadvantage.

Amongst the advantages of electrostatic filters is their relatively good particle collection capacity, at least when they are new. The above described filters, however, show a plurality of disadvantages, amongst others the difficulty of cleaning the particle collecting part for reuse. These difficulties are attributable to the construction of said filters.

In this connection it should be mentioned that electrostatic filters of which the plates are made of metal or in which metal is comprised, require a coupling resistance between the plates and earth. This has shown to be a disadvantage on one hand from the function point of view—if one or more of the plates is short-circuited, then a large part of the filter's capacity is lost. Because of this the filter is usually divided into sections with respect to the plates. Furthermore this construction in itself is a disadvantage from a recycling point of view because a number of parts constructed of different materials must be taken apart and sorted, e.g. metal plates, resistance wires, condensers and plastic rails in addition to the casing and other associated components.

Further, in the applicant's own application SE,A,9303059 with the filing date Sep. 17, 1993 an electrostatic filter for the separation of particles is described which comprises a particle charging unit arranged upstream, comprising on the one hand a corona wire for the charging of the particles, and on the other hand a particle collector unit arranged downstream relative to this and which is at least partially earthed. The particle collector unit comprises a plurality of plates arranged in a casing, whereat the casing and the plates are arranged to have essentially the same electric potential in relation to the corona wire This is achieved through the plates and the casing being earthed and by the material in casing and the plates each comprising a non-hygroscopic material with high resistivity corresponding essentially to the mass resistivity of a so called soft-earthed material.

Even if the last filter solves some of the above mentioned problems, it has surprisingly been shown that further improvements are achievable with a filter according to the invention of the type given below.

OBJECTS OF THE INVENTION

The purpose of the present invention is to produce an improved electrostatic filter in which the above mentioned disadvantages are eliminated and in which a very high particle collecting efficiency can be retained during a long period of use.

A further purpose is to achieve an electrostatic filter in which the particles charged by means of corona discharge are guided towards the plates of the particle collecting unit without the use of control plates connected to a voltage source. Control plates of the type mentioned, as is easily understood, lead to problems during cleaning of the unit.

A further purpose of the invention is to produce an electrostatic filter in which the filter is independent of electrically connected control plates which necessitate insulating plates between them.

A further purpose is to reduce the number of components in the electrostatic filter.

A further purpose is to achieve independence of the moisture content in the gas-like flow streaming through the filter arrangement.

A further purpose is to be able to produce the filter arrangement in a simple and economical manner and at the same time achieve easy cleaning of it and to produce a product which can be recycled in a simple and cheap manner.

A further purpose is to improve the particle collecting capability in the particle collector part.

A further purpose is to produce an improved supply air terminal which as well as filtering the incoming air can also warm it.

SUMMARY OF THE INVENTION

The electrostatic filter according to the invention has a number of advantages. Because its construction it is easy to clean and easy to manufacture because the constituent elements in the particle collecting part can all be formed in the same material if it is so desired and subsequently they can be mounted in a simple way to form a unit through the plates being passed in one or more eventually pairwise arranged comb-like means whereafter the set of plates can further be united by a band being tensioned around it so that a packet is achieved.

Because the particles are charged by means of corona discharge in the particle charging part and are subsequently discharged and collected in the partly earthed particle collection part, the particle charging part is the only part of the arrangement where high voltage and/or voltage is required. In the particle collecting part only earthing is required.

By building up the particle collecting part in the form of a number of elements united by means of the comb-like means and the compressing bands, this part can be mounted separately, like a packet, and placed in the electrostatic filter, e.g. by sliding into a holder and at the same time because of the characteristics of the elements no coupling resistance between earth or another voltage source is required. All that is required is a simple earthing of the plates which should be earthed.

In order that the particles should stay on the plates it is necessary that they should be discharged in close contact with the plates and not discharged at a distance which is too far from the plates. A suitable distance between the plates can be for example approximately 5–10 mm, preferably 5–8 mm.

The material of which the elements are manufactured has a mass resistivity equivalent a so-called soft-earth metal. By soft-earth or semiconducting material this is meant, where appropriate, the physical description of materials with a mass resistivity of approximately $10^2$ to $10^{11}$ $\Omega$cm. In the invention plastic materials with suitable charateristics, e.g. polypropene, polyethene, copolymers of this type or the like are preferably used as soft-earth materials. These materials can if it becomes necessary be doped with carbon powder or in any other appropriate manner be equipped with a mixture of substances known to the man skilled in the art in order to achieve the desired conductibility.

The elements can advantageously be manufactured from one or more non-hygroscopic polymer plastic materials with a mass resistivity which preferably lies within the range $1\times10^{2}$ $\Omega$cm to $1\times10^8$ $\Omega$cm, more preferably $1\times10^3$ $\Omega$cm to $1\times10^7$ $\Omega$cm, more precisely $1\times10^3$ $\Omega$cm to $1\times10^4$ $\Omega$cm.

It is of course possible that combinations of these materials occur equally in the form of mixtures as in the form of layered elements or elements with coatings. It is naturally also conceivable that the elements consist of several band-like parts, which are manufactured from materials with the above mentioned characteristics and of materials which are compatible with each other.

During the choice of materials account must naturally be taken of the environment in which the filter arrangement is to be used, normal atmosphere, corrosive or the like. Account must also be taken of the burning characteristics and fire safety as well as of the gases possibly given off by the material in the case of fire. This is, however, something which is completely within the capability of the man skilled in the art to test.

A further advantage in the filter arrangement according to the invention is that a number of components which are necessary in the electrostatic filters according to the state of the art can be left out, such as the coupling resistance, electrically connected guide plates, well as the material of which the elements and, in the main, essentially the whole of the particle collecting parts are constructed can be easily taken care of as if they were essentially one material which means that the final recycling becomes more cost-effective and easier to perform.

It has been shown to be relevant to the particles' ability to fasten on the elements of the particle collecting part that the charged particles, when they pass through the particle collecting part, have a suitable speed so they can get rid of their charge to these elements without being pushed away from them through recoil. A suitable flow-speed during the passage between the elements is of the order of 1 m/sec.

It is also important that the resistivity of the elements is neither too high nor too low because the particles' charge is not delivered to elements which have too high a resistivity and at too low a resistivity the charge is delivered to the element at a distance away from it which leads to a "discharging" of the particles and thereby that the particles in both cases continue through the unit without fastening onto the elements.

An improvement can also be achieved by giving the elements a non-smooth, uneven surface, alternatively a roughened surface. This surface can be achieved in many ways, e.g. by extruding the elements which are subsequently roughened or during moulding the mould can be sparked so that during the moulding it makes an element with an uneven surface.

It has surprisingly been shown that the filter according to the invention can be combined with an addition in which warming of the air flowing through the filter can occur. In this way a supply air terminal is obtained which is effective with respect to the removal of dirt and particles out of the air flowing through the filter which at least under part of the year can consist of cold outside air and simultaneously this air can be warmed so that a more comfortable temperature is achieved and that the feeling of cold draughts is avoided in the room into which the air flows.

BRIEF DESCRIPTION OF THE DRAWINGS

The invention is described below in more detail in connection to the appended drawing

DESCRIPTION OF THE PREFERRED EMBODIMENTS

Figure 1:
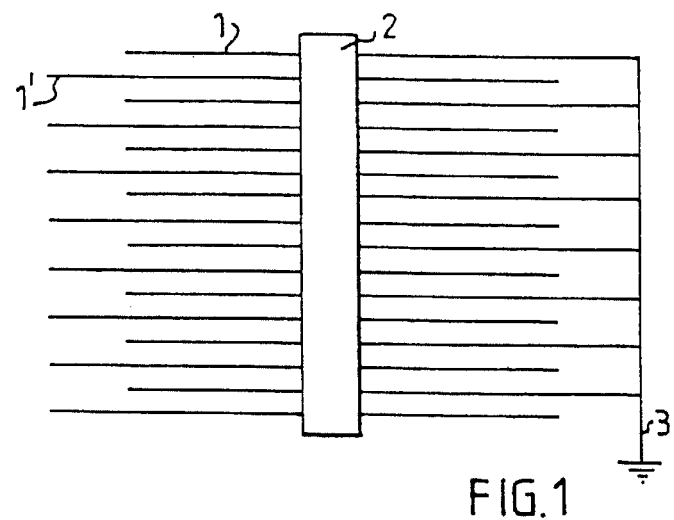
FIG. 1 shows a plurality of plate-like elements according to the invention with the uniting comb-like means in a view seen from above.

FIG. 1 shows a filter arrangement with an electrostatic filter according to the invention. For the sake of clarity the other parts in the filter which are known, such as the outer casing, possible fan arrangement, possible control unit etc, are not shown. This arrangement is consequently amongst others intended to be mounted in e.g. an electrostatic filter with a fan arrangement which brings the air which is to be cleaned through the filter arrangement. The filter can naturally also be placed in a ventilation room where the fan is arranged like a normal extraction fan, i.e. not in connection with the filter.

The filter comprises two groups of shaped elements which are manufactured from the earlier specified material. In this embodiment the elements 1, 1' are arranged in two groups whereby the elements in the two groups are alternatively arranged and groupwise offset with reference to each other. The elements 1 in the first group are joined with each other and to earth 3. This earthing can for example take place by the elements mounted the comb-like borders being slid into a holder in the filter casing in the form of a packet until the elements which are to be earthed come into contact with the flexible earth strap of conducting material, for example a porous electrically conducting elastomer or foamed plastic, or a non-rigid textile strip. It should be obvious to the skilled man how such an earthing can be designed in order that the elements to be earthed should make good contact with the earth strip.

Figure 2:
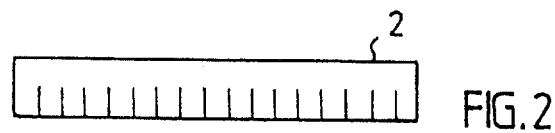
FIG. 2 shows the comb-like uniting means from the side.

The elements 1, 1' are held at a predetermined distance apart by one or more comb-like borders 2. These comb-like borders are shown seen from the side in FIG. 2. The filter arrangement is preferably held together through bands (not shown) tightened around the arrangement. These bands can advantageously be tightened outside the comb-like borders. The comb-like borders are made of an insulating material so that the group of elements 1' which are not earthed can continue to take up a potential dependent on the filter arrangement geometry and the charging part. More on this follows below.

As the skilled man would understand, the number of elements is a dimensioning question dependent on the through-flow speed, the size of the through-flow and other parameters which are experimentally determinable by the skilled man.

Figure 3:
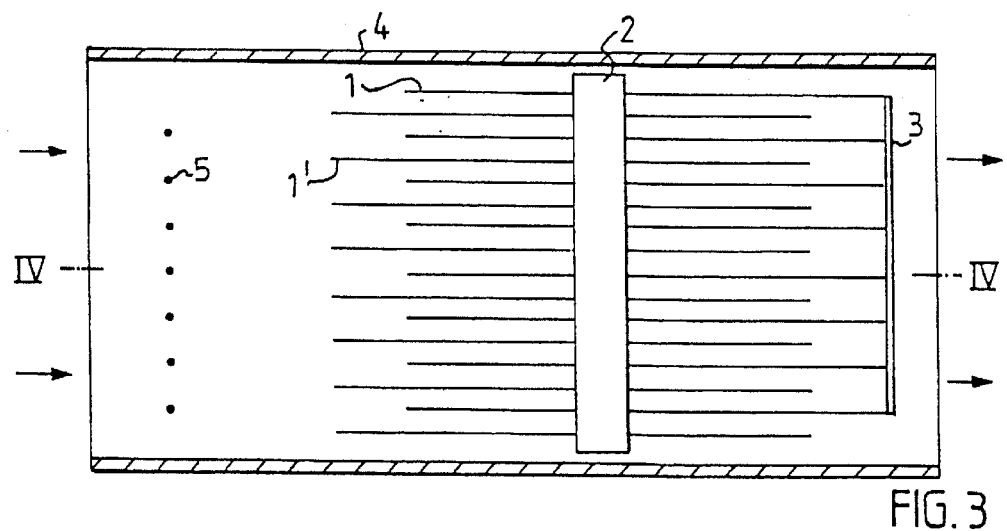
FIG. 3 shows a first embodiment of an electrostatic filter according to the invention placed in a casing or a duct seen in the direction of flow of the flow with the upper side of the casing or duct removed.

In FIG. 3 the particle collector part is shown placed in a casing 4 in which in addition to the particle collector part the particle charging part is also arranged, i.e. one or more corona wires 5 are arranged before the arrangement in the flow direction of the air which is shown by arrows. Several electrically conducting, elongated corona wires 5 are wire up in such a way that they run through the casing 4 in its transverse direction and at a distance from the elements. The uniting border 2 and the earth-connections 3 between the elements 1 are also shown.

It should be noticed that the arrangement of one or more corona wires can alternatively take place in a direction in the cross section of the casing but at right angles to that shown in the drawings.

Figure 4:
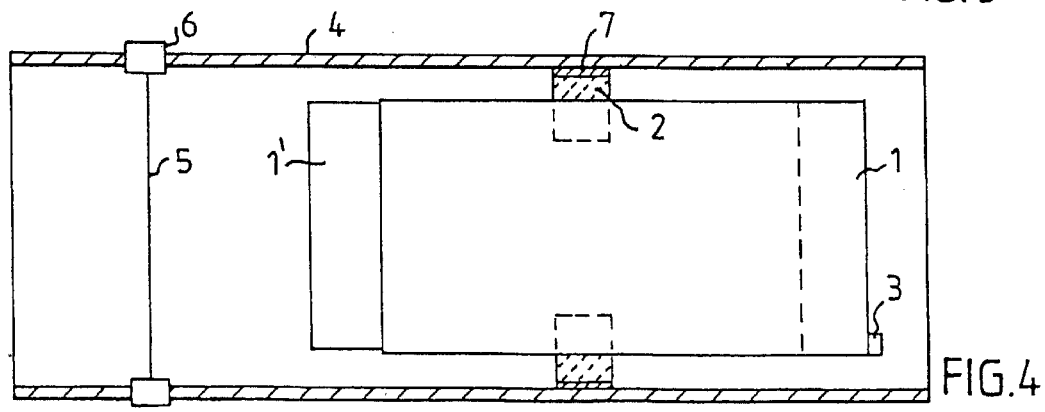
FIG. 4 shows a section along the line IV—IV in FIG. 3, where, however, the upper side of the duct/casing is shown.
Figure 5:
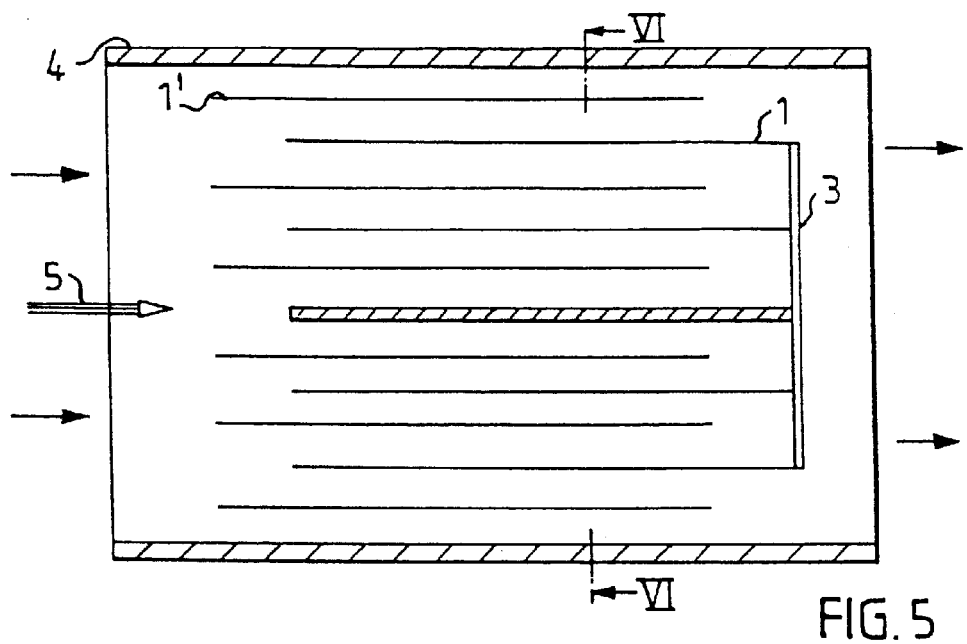
FIG. 5 shows a second embodiment of an electrostatic filter according to the invention.

FIG. 4 shows the same arrangement in a cross section along line IV—IV in FIG. 3. Here it is shown how the corona wire 5 is fastened in the casing 4 by means of an insulating attachment 6. The offset between the two groups of flat-shaped elements 1, 1' can be clearly seen. FIG. 3 shows the earth-connection which connects the group of plate-like elements 1 to earth and 7 refers to the band which in order to hold the plate-like elements 1, 1' together is tensioned around these and the comb-like means 2. FIG. 5 shows a second embodiment of a filter arrangement according to the invention placed in a casing 4 in which in addition to the particle collector part a particle charging part is arranged, i.e. a corona electrode 5 is arranged at a predetermined distance in front of the particle collector part in the flow direction of the air which is shown by arrows. In the particle collector part there are two groups of concentric to each other alternatively arranged hollow cylindrical elements, on one hand earthed elements 1 and on the other hand insulated elements 1'. Several electrodes 5 can naturally be arranged if this is appropriate without deviating from the inventive concept. The border 3 earths the group of elements 1.

Figure 6:
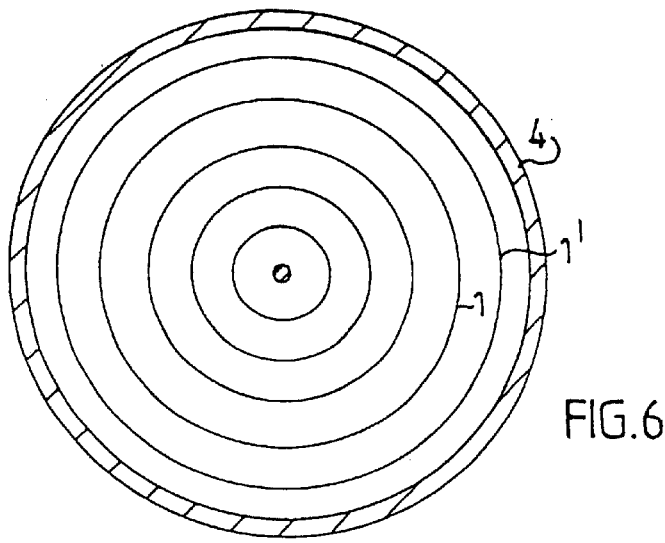
FIG. 6 shows a section through the filter in FIG. 5 along the line VI—VI.

FIG. 6 shows the filter arrangement in FIG. 5 in cross section. The casing here has also been referenced by reference numeral 4 and the earthed elements with 1 and the insulated elements with 1'. In order to hold the concentric elements at the right distance apart, distance elements (not shown) are used.

In a further embodiment of the invention according to the claims it is conceivable that the two groups of earthed respectively unearthed elements are not offset in relationship to each other, they can have essentially the same size or alternatively have different lengths in the direction of flow, i.e. the edges of the elements which are furthest away in the direction of flow could extend equally far while the front edges of the non-earthed elements could extend nearer to the particle charging unit whereby the earthing of the elements which are to be earthed must be arranged in a somewhat different manner.

It should be noted that the comb-like borders can be placed as necessary either in pairs or alternatively on each side of the plate-like elements. It is also conceivable that in certain special cases it would not be necessary to have more than one comb-like border to hold together the packet. In the case with concentrically arranged elements the comb-like border can if desired be replaced by other forms of electrically non-conducting distance elements.

The particles which are to be separated out of the air flowing through the electrostatic filter are charged during passage through the high-voltage part, i.e. where they pass the corona wires. During use the group of elements which are not earthed and which extend forwardly past the earthed elements will have an electrical voltage distribution which is dependent on the geometry and voltage on the corona wires. The edges of these elements which are placed nearest to the corona wires will have an opposing charge to the corona wires, i.e. the same charge but not necessarily of the same strength which the particles receive during their passage through the particle charging part past the corona wires. This means that the particles will be led to the desired degree in the direction towards the earthed elements whereby a discharging of the particles towards earth occurs and whereby the particles are adsorbed on the surface of the earthed elements.

Through the construction of the arrangement the elements with their uniting band can easily be removed from the filter arrangement as a packet and cleaned in an elective manner, for example through simple rinsing, or the arrangement can be recycled.

Figure 7:
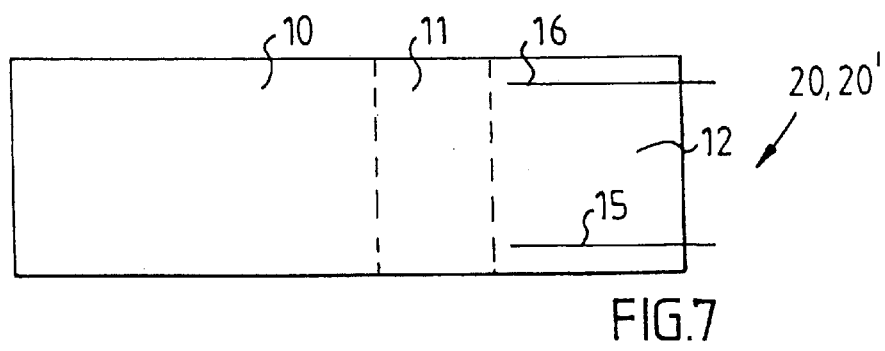
FIG. 7 shows a plate-like element intended for a supply air terminal which comprises the electrostatic filter according to the invention as an integrated unit.
Figure 8:
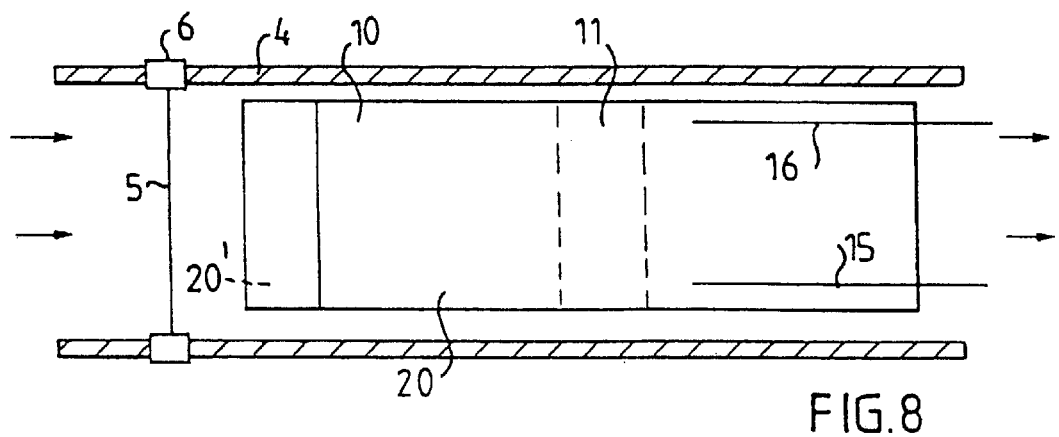
FIG. 8 shows schematically a first embodiment of a supply air terminal comprising the electrostatic filter according to the invention.
Figure 9:
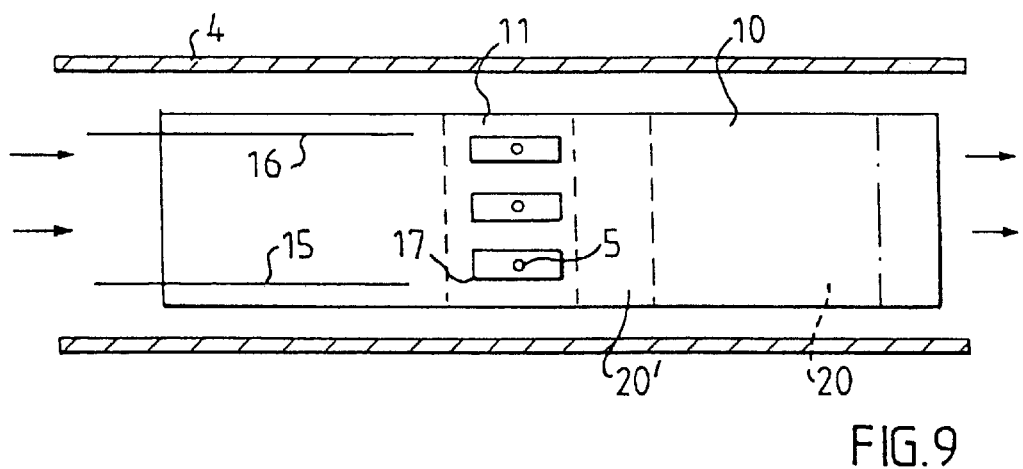
FIG. 9 shows schematically a second embodiment of a supply air terminal comprising the electrostatic filter according to the invention.

The above advantages also apply to the embodiments of a supply air terminal which comprises the electrostatic element according to the invention as an integrated unit and as shown in FIG. 7 to FIG. 9.

FIG. 7 shows a plate-like element 20, 20' intended for a supply air terminal. This element comprises three different zones of polymer plastic material with different characteristic The first zone 10 is formed from the material which is described above in connection to the elements 1 respectively 1' comprised in the particle collecting unit. The second zone 11 is made of an electrically insulating plastic material and the third zone 12 is made from a plastic, a conducting polymer, for example having a PCT (positive temperature coefficient) effect upon the application of a voltage. This means that the electrical resistance of the plastic increases with increasing temperature. Such plastics are known in the state of the art. The advantage with this type of material is that it can be chosen so that a suitable heating effect can be achieved whereby with an increase of temperature heating of the polymer material reduces and finally stops completely. This behaviour of the plastic is naturally reversible. This means that the construction of the heating part is simplified because no complicated control equipment is needed. In zone 12 two electrical conductors 15, 16 are arranged, for example parallel with the longitudinal direction of element and which are connectible to an electrical voltage source with example 220 or 110 V alternating current. By connecting a voltage a resistive heating up of the material occurs.

These extended elements 20, 20' can be made through joint extrusion of the different materials whereby they form a continuous unit.

The second zone 11 can also be shaped with stamped out openings in order to permit, for example, one or more corona wires to pass through the elements. The reason for this is described below.

FIG. 8 shows schematically a first embodiment of the supply air terminal comprising an electrostatic filter according to the invention where the extended element according to FIG. 7 is arranged essentially in the same way as described for the electrostatic filter above, but where the regions of the elements which are made of the electrically heatable plastic are arranged in connection to and after the particle collecting unit.

The outer casing of the outlet is shown by 4. In the direction of the flow of the air (shown with arrows) are first arranged one or more corona wires 5 with electrically insulating supports 6. Next is the front edge of the element 20', which belongs to the group of electrically insulated elements, partially hidden by an element 20 lying in front of it which belongs to the group of earthed elements. These two types are preferably arrange alternatively. The part of the elements which are referenced with 10 concerns the zone which has the special mass resistivity which was mentioned earlier for the polymer materials according to the invention, i.e. this part of the element can advantageously be made from one or more non-hygroscopic polymer materials with a mass resistivity which preferably lies within the region $1 \times 10^2$ Ωcm to $1 \times 10^8$ Ωcm, more preferably $1 \times 10^3$ Ωcm to $1 \times 10^7$ Ωcm, more precisely $1 \times 10^3$ Ωcm to $1 \times 10^4$ Ωcm. Zone 11 with the non-conducting plastic follows in the direction of flow of the air and then zone 12 with electrical heating by means of conductors 15 and 16 which are connectible according the above.

FIG. 9 shows schematically a second embodiment of a supply air terminal comprising electrostatic filter according to the invention, where the elements according to FIG. 7 are arranged essentially in the same way as described for the electrostatic filter above but where the regions of the elements which are made of the electrically heatable plastic are arranged in direct connection to and in front of the particle collecting unit.

The outer casing of the outlet is shown by 4. First zone 12 with electrical heating by means of conductors 15 and 16, which are connectible according to the above, is arranged in the direction of flow of the air after which follows zone 11 on the elements whereby one or more corona wires 5 are arranged in such a way that they can pass through the openings 17 arranged in zone 11. This is the part of the elements which is made of the electrically insulating plastic. In the direction of flow of the air there then follows the particle collector zone wherein the front element 20' belongs to the group of electrically insulated elements and behind this there is a partially hidden element 20 which belongs to the group of earthed elements. These two types of element are preferably arranged alternatively. The part of the elements which have the reference sign 10 concern the zone which has the special mass resistivity which was given above for the polymer material according to the invention, i.e. the part of the elements that can be advantageously manufactured of one or more non-hygroscopic polymer materials with a mass resistivity which preferably lies within the region of $1 \times 10^2$ Ωcm to $1 \times 10^8$ Ωcm, more preferably $1 \times 10^3$ Ωcm to $1 \times 10^7$ Ωcm, more precisely $1 \times 10^3$ Ωcm to $1 \times 10^4$ Ωcm.

The embodiment according to FIG. 7 to 9 can also be arranged in the shape of cylindrical elements in the same manner as shown in the embodiment according to FIG. 5 and FIG. 6.

Within the scope of the invention as defined in the claims it is also conceivable that extra elements are placed between those mentioned earlier in order to for example achieve a changed geometry, which in its term can give advantageous changes of tie field distribution in the arrangement, for example one group of elements can be doubled or an extra element of the one or the other group can be replaced for similar reasons.

The invention is in no way limited to the above described embodiments but can be freely varied within the scope of the appended claims.

What is claimed is:

1. In an electrostatic filter device for separating particles which comprises an upstream particle charging unit having at least one corona electrode for charging particles, and a particle collecting unit arranged downstream relative to said particle charging unit, the improvement wherein the particle collecting unit comprises two groups of parallel hollow cylindrical elements concentric to each other and alternatively arranged at a predetermined distance from each other, a first group of elements being connected to earth, and a second group of elements being electrically insulated with respect to the device and the first group of elements; and the composite constituent materials of said cylindrical elements being homogeneous and consisting essentially of one or more non-hygroscopic polymer materials with a mass resistivity within the range of $1\times10^2$ Ωcm to $1\times10^8$ Ωcm.

2. The electrostatic filter device according to claim 1, wherein the mass resistivity ranges from $1\times10^3$ Ωcm to $1\times10^7$ Ωcm.

3. The electrostatic filter device according to claim 1, wherein the mass resistivity ranges from $1\times10^3$ Ωcm to $1\times10^4$ Ωcm.

4. The electrostatic filter device according to claim 1, wherein the elements are alternately offset between themselves in the longitudinal direction of the elements, whereby the first group of elements are arranged furthest away from the particle charging unit and are connected to earth, and the second group of elements are electrically insulated with respect to the device and to the first group of elements and arranged nearer to the particle charging unit.

5. The electrostatic filter device according to claim 1, further comprising holding-together means of essentially insulating material, arranged at a predetermined relative distance from each other for holding the elements.

6. The electrostatic filter device according to claim 5, wherein the cylindrical elements and the holding-together means use a band in order to form a packet.

7. The electrostatic filter device according to claim 1, wherein the material in the elements is a plastic material doped with carbon.

8. The electrostatic filter device according to claim 1, wherein the surface of the elements has a non-smooth uneven alternatively roughened surface.

9. The electrostatic filter device according to claim 1, wherein the elements have at least two zones with different resistivities separated from each other by an area with a higher or lower resistivity.

10. A supply air terminal, which comprises as an integrated unit an electrostatic filter device according to claim 1, and wherein at least a predetermined number of the elements comprised in the filter device are shaped so as to form a first zone in an enlarged element which continuously at one end extends into a second zone with electrically insulating plastic, and the second zone continuously extends into third zone which comprises a conducting plastic suitable for resistance heating; said third zone has at least two conductors connectable to a voltage source, arranged for electrical resistant heating of at least a part of the third zone.

* * * * *